(12) United States Patent
Schmidt et al.

(10) Patent No.: US 9,277,143 B2
(45) Date of Patent: Mar. 1, 2016

(54) THERMAL IMAGING CAMERA WITH REPOSITIONABLE ACTIVE PORTIONS OF FOCAL PLANE ARRAY

(71) Applicant: Fluke Corporation, Everett, WA (US)

(72) Inventors: Matthew F. Schmidt, River Falls, WI (US); Kirk R. Johnson, Rogers, MN (US)

(73) Assignee: Fluke Corporation, Everett, WA (US)

( * ) Notice: Subject to any disclaimer, the term of this patent is extended or adjusted under 35 U.S.C. 154(b) by 679 days.

(21) Appl. No.: 13/673,640

(22) Filed: Nov. 9, 2012

(65) Prior Publication Data

US 2014/0132774 A1 May 15, 2014

(51) Int. Cl.
*H04N 5/33* (2006.01)
*H04N 5/225* (2006.01)
*H04N 5/367* (2011.01)

(52) U.S. Cl.
CPC ............... *H04N 5/33* (2013.01); *H04N 5/2253* (2013.01); *H04N 5/367* (2013.01); *Y10T 29/49904* (2015.01)

(58) Field of Classification Search
CPC ........... F41G 3/147; G01S 17/66; H04N 5/33; H04N 5/225; H04N 5/2253
See application file for complete search history.

(56) References Cited

U.S. PATENT DOCUMENTS 5,532,484 A * 7/1996 Sweetser et al. ............... 250/332
8,653,461 B1 * 2/2014 Benson et al. ............ 250/339.01
2012/0275038 A1 11/2012 Hughes

FOREIGN PATENT DOCUMENTS

GB 2421654 A * 6/2006

* cited by examiner

*Primary Examiner* — Huy T Nguyen
(74) *Attorney, Agent, or Firm* — Fredrikson & Byron, P.A.

(57) ABSTRACT

A thermal imaging camera with a repositionable focal plane array (FPA) is disclosed. An active portion of the FPA is used by the camera to generate a thermal image. The FPA may be positioned such that a defect in the FPA is located in an unused and inactive portion of the FPA.

22 Claims, 8 Drawing Sheets

THERMAL IMAGING CAMERA WITH REPOSITIONABLE ACTIVE PORTIONS OF FOCAL PLANE ARRAY

BACKGROUND

Thermal imaging cameras are used in a variety of situations. For example, thermal imaging cameras are often used during maintenance inspections to thermally inspect equipment. Example equipment may include rotating machinery, electrical panels, or rows of circuit breakers, among other types of equipment. Thermal inspections can detect equipment hot spots such as overheating machinery or electrical components, helping to ensure timely repair or replacement of the overheating equipment before a more significant problem develops.

Thermal imaging cameras include sensors for detecting infrared energy in a scene being viewed by the camera. An example of such a sensor is a focal plane array (FPA) which generates an electrical signal in response to infrared energy received through the camera lens. The FPA includes sensor elements, such as bolometers or photon detectors, and each such sensor element may be referred to as a sensor pixel. The electrical resistance or voltage of the sensor pixels changes in response to infrared energy and can therefore be used to generate a thermal image.

The focal plane array includes a plurality of sensor pixels arranged side by side, often in vertical columns and horizontal rows. However, one or more sensor pixels may be inoperable or may become damaged during production of the FPA and prior to placement in the thermal imaging camera. In some cases, such as when only a single pixel is inoperable, the processor of the camera can compensate for the inoperable pixel by mathematical analysis of the data from the surrounding pixels to estimate the thermal energy reading that would be obtained by the inoperable sensor pixel if it were functioning normally, and use that estimate in producing the thermal image. However, in other cases, such as when multiple pixels which are adjacent to each other are inoperable, such an estimate of the thermal energy reading is less effective, resulting in a defect which may be perceptible and/or objectionable to a manufacturer or end user. In such cases, the manufacturer may choose to discard the FPA.

In some cases, if the defect is located on the periphery of the FPA, the thermal imaging camera may use only the central portion of the FPA for gathering thermal energy readings. In this way, the FPA can still be used, though a reduced number of sensor pixels would be used to create the thermal image. However, such adjustments are not possible if the defect is located too close to the center of the FPA. In addition, portions of the periphery of the FPA which are fully functional, or which include pixels for which mathematical compensation is acceptable, remain unused and are therefore wasted in such a scenario.

SUMMARY

Certain embodiments of the invention include an infrared camera having a focal plane array (FPA), an FPA mount to which the FPA is mounted, a lens assembly, and a support to which the FPA mount is attached. The FPA has an active portion used by the camera to generate an infrared image and an inactive portion which is not used by the camera to generate an infrared image. A defect in the FPA is located in the inactive portion. The active portion's center point is displaced from FPA's center point such that the active portion does not include the defect.

Certain embodiments of the invention include an infrared camera that has a focal plane array (FPA), an FPA mount that includes one or more positioning elements, a lens assembly, and a support that includes one or more positioning elements complementary to one or more of the positioning elements of the FPA mount. The positioning elements of the FPA mount and the support allow the FPA mount to be aligned with the support in one of several positions and the FPA mount is attached to the support in the one of the plurality of positions. The position in which the FPA mount is attached to the support determines an active portion of the FPA which is separate from an inactive portion of the FPA. The FPA includes a defect that is located in the inactive portion.

Certain embodiments of the invention provide a method of producing an infrared camera. The method includes identifying a defect in a focal plane array (FPA), attaching the FPA to an FPA mount in a position, attaching the FPA mount to a support in a position, attaching a lens assembly to the camera in a position. The FPA includes an active portion used by the camera to generate an infrared image and an inactive portion which is not used by the camera to generate the infrared image. The position of one of the FPA, the FPA mount, or the lens assembly is selected from several available positions such that the active portion does not include a defect that exists in the FPA. The several available positions include a position in which the center point of the active portion is displaced from the center point of the FPA and a position in which the center point of the active portion generally coincides with the center point of the FPA.

DETAILED DESCRIPTION

Figure 1:
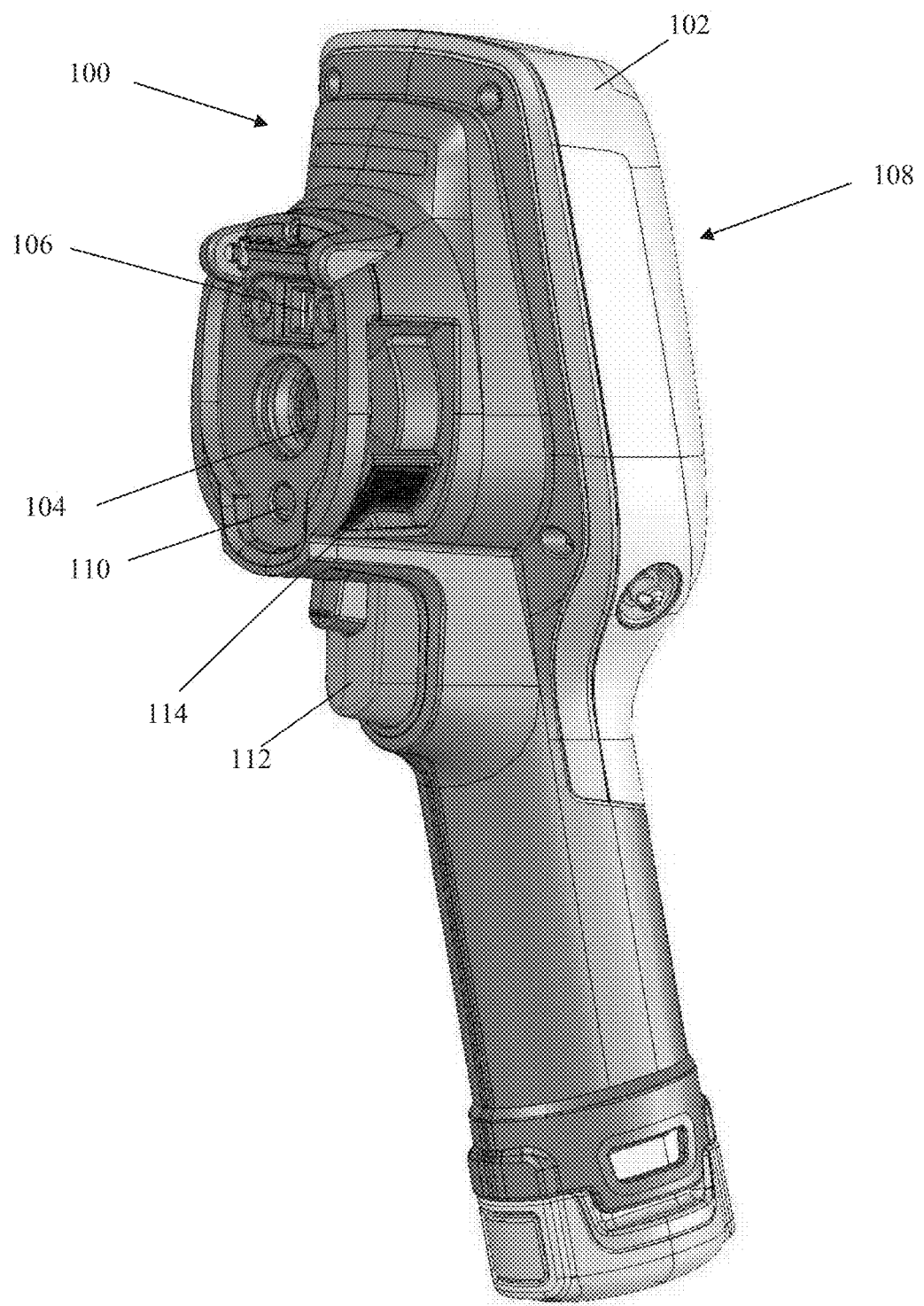
FIG. 1 is a perspective front view of an example thermal imaging camera.

The following detailed description is exemplary in nature and is not intended to limit the scope, applicability, or configuration of the invention in any way. Rather, the following description provides some practical illustrations for implementing examples of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene under observation. The thermal imaging camera may detect infrared radiation given off by the scene and convert the infrared radiation into an infrared image indicative of the heat patterns. In some examples, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

One component of the infrared sensor is the focal plane array (FPA). The FPA includes columns and rows of sensor pixels which detect infrared energy emitted by a target scene and focused on the focal plane array by the camera lens or lenses. During manufacturing, one or more of the sensor pixels may become inoperable. Therefore the FPA may be tested prior to placement into a camera in order to identify defective sensor pixels. If such defective pixels are significant enough to form a defect which interferes with the detection of infrared energy and/or the production of an image, various embodiments allow for a only portion of the FPA to be used for detecting infrared energy, referred to as the active portion. The remainder of the FPA may be unused and is referred to as the inactive portion. The camera may be manufactured or programmed such that the defects are located in the inactive portion of the FPA, while the active portion includes only normal functioning pixels or pixels which may be defective but which would not interfere with infrared energy detection of the scene to an objectionable degree. In this way, the FPA can still be used for production of a thermal imaging camera, even if it includes an objectionable defect. Allowing for use of a selected active portion provides a cost savings for the manufacturing of thermal imaging cameras, in that otherwise unusable FPAs can be used rather than discarded.

The portion of the FPA which is the active portion is determined by the alignment of the FPA relative to the infrared lens or lenses which focus infrared energy upon the FPA. However, it should be noted that any portion of the newly made FPA may include a defect, and the portion of the FPA which may be used as the active portion requires avoiding the defect. The location of the active portion of the FPA therefore varies from one FPA to the next. However, repositioning the FPA within the camera to any possible position could be very time consuming and therefore could add to the expense of production. Embodiments of the invention therefore provide efficient ways to reposition the FPA relative to the lens during manufacturing in order to allow different portions of the FPA to be used as the active portion while limiting production difficulty and expense.

In some embodiments, the components of the thermal imaging camera are designed to provide a plurality of position options that may be employed for alignment of the components during manufacturing of the thermal imaging camera. Depending upon the location of the defect, the active portion of the FPA may be selected and the corresponding position option may be used during manufacturing. When the selected position option is used, the infrared lens is aligned with the active portion of the FPA and use of the inactive portions is avoided. The camera components may include positioning elements, which allow for the selection of the position of one or more elements from a plurality of position options. These positions options may be predetermined or may be adjustable during assembly of the thermal imaging camera. For example, in some embodiments, the FPA may be repositionable within the infrared sensor assembly. In other embodiments, the FPA mount, which may be a printed circuit board, a mounting board, or other thermal imaging camera component, to which the infrared sensor assembly is attached may be repositionable within the thermal imaging camera. In still other embodiments, the lens assembly may be repositionable relative to the thermal imaging camera and therefore relative to the infrared sensor assembly within the thermal imaging camera. The repositionable nature of the component may allow the component to be optionally positioned in one of a variety of predetermined or fixed positions, or may allow the component to be incrementally adjusted to any desired position.

Figure 2:
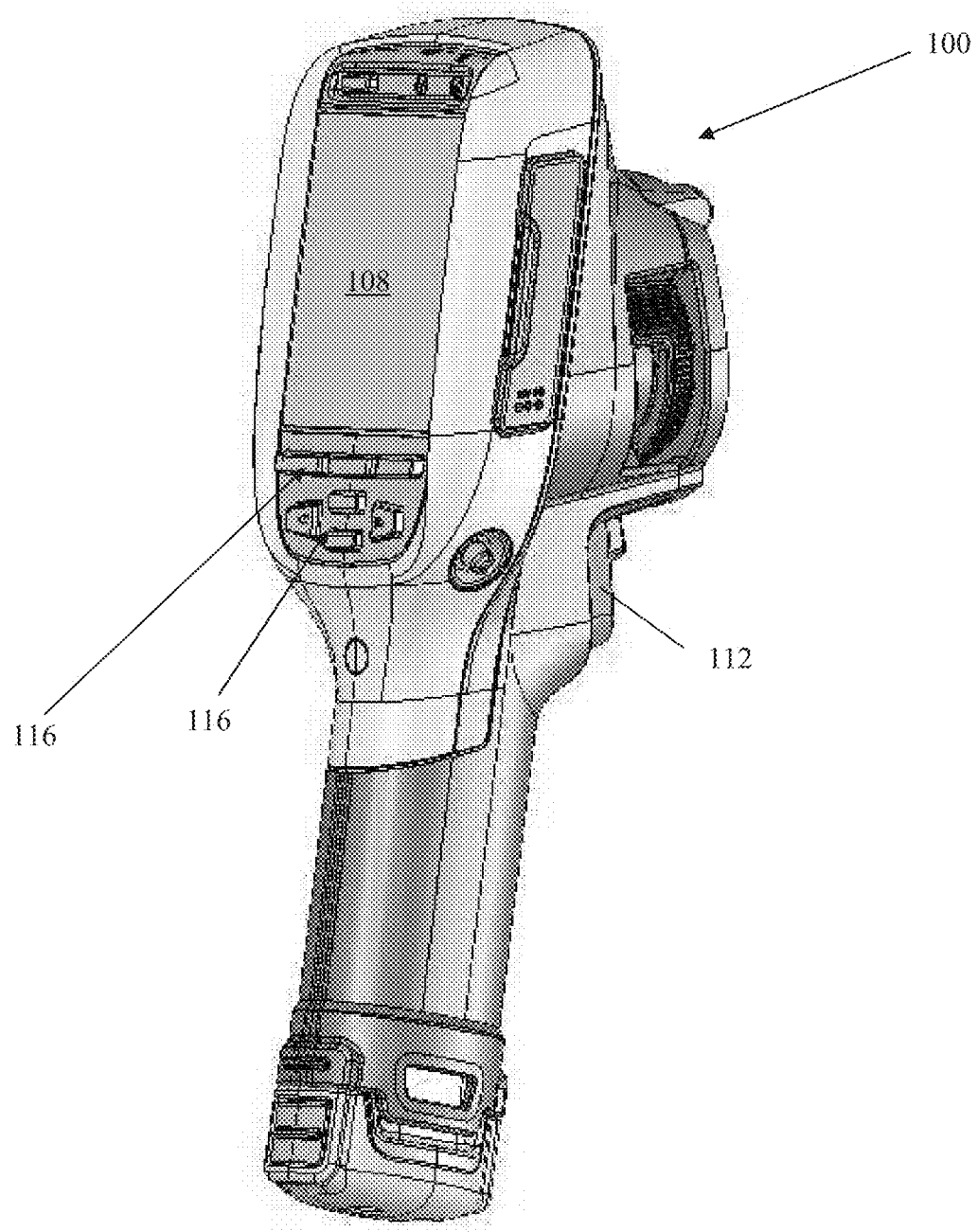
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

Data of the distance-to-target, as measured by the laser 110, can be stored and associated with the corresponding captured image. For images which are captured using automatic focus, this data will be gathered as part of the focusing process. In some embodiments, the thermal imaging camera will also detect and save the distance-to-target data when an image is captured. This data may be obtained by the thermal imaging camera when the image is captured by using the laser 110 or, alternatively, by detecting the lens position and correlating the lens position to a known distance-to-target associated with that lens position. The distance-to-target data may be used by the thermal imaging camera 100 to direct the user to position the camera at the same distance from the target, such as by directing a user to move closer or further from the target based on laser measurements taken as the user repositions the camera, until the same distance-to-target is achieved as in an earlier image. The thermal imaging camera may further automatically set the lenses to the same positions as used in the earlier image, or may direct the user to reposition the lenses until the original lens settings are obtained.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that is a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
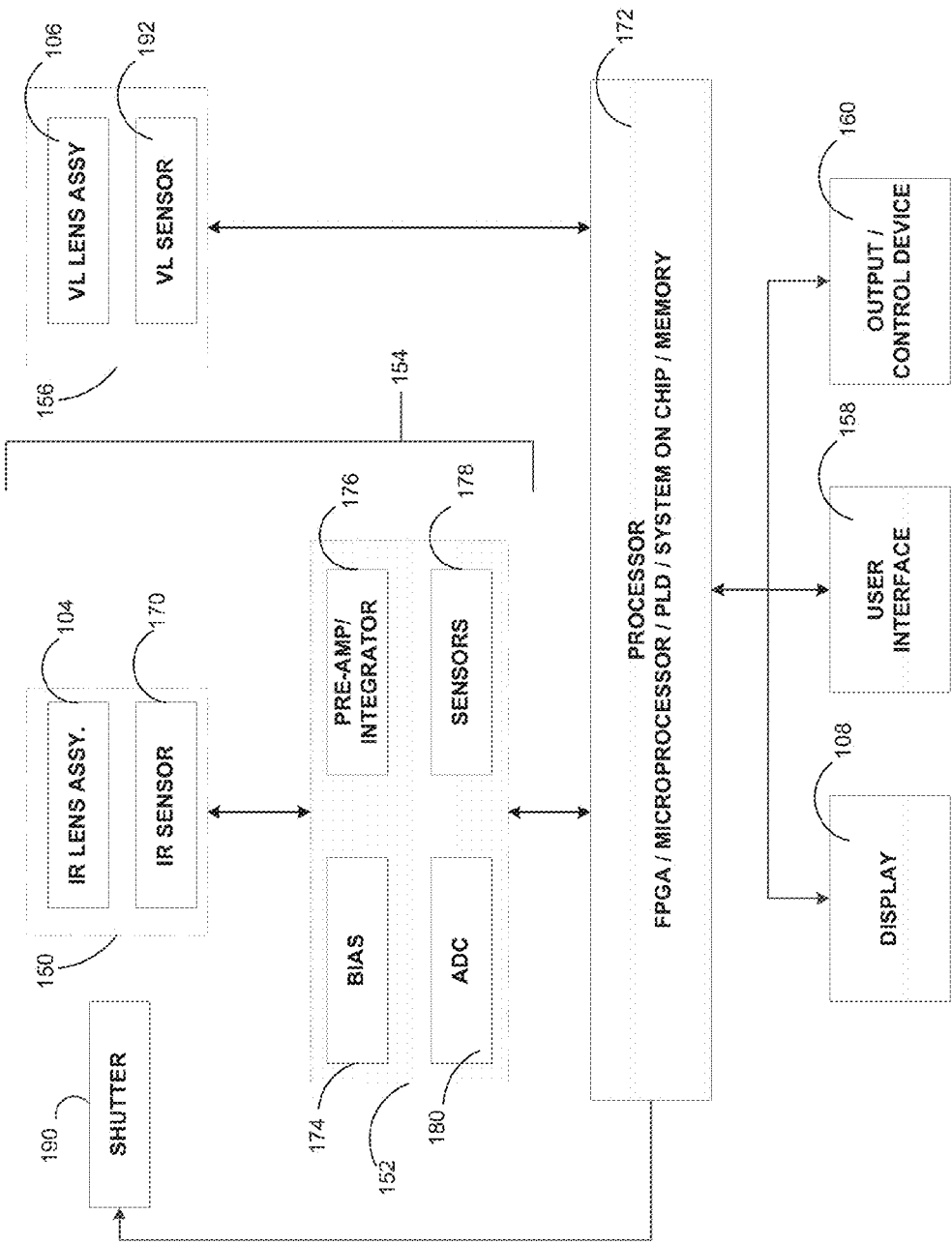
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 150, front end circuitry 152. The IR camera module 150 and front end circuitry 152 are sometimes referred to in combination as front end stage or front end components 154 of the infrared camera 100. Thermal imaging camera 100 may also include a visible light camera module 156, a display 108, a user interface 158, and an output/control device 160.

Infrared camera module 150 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 150 can include any suitable components for performing the functions attributed to the module herein. In the example of FIG. 3, infrared camera module 150 is illustrated as including infrared lens assembly 104 and infrared sensor 170. As described above with respect to FIGS. 1 and 2, infrared lens assembly 104 includes at least one lens that takes infrared energy emitted by a target scene and focuses the infrared energy on infrared sensor 170. Infrared sensor 170 responds to the focused infrared energy by generating an electrical signal that can be converted and displayed as an infrared image on display 108.

Infrared lens assembly 104 can have a variety of different configurations. In some examples, infrared lens assembly 104 defines an F-number (which may also be referred to as a focal ratio or F-stop) of a specific magnitude. An approximate F-number may be determined by dividing the effective focal length of a lens assembly by a diameter of an entrance to the lens assembly (e.g., an outermost lens of infrared lens assembly 104), which may be indicative of the amount of infrared radiation entering the lens assembly. In general, increasing the F-number of infrared lens assembly 104 may increase the depth-of-field, or distance between nearest and farthest objects in a target scene that are in acceptable focus, of the lens assembly. An increased depth of field may help achieve acceptable focus when viewing different objects in a target scene with the infrared optics of thermal imaging camera 100 set at a hyperfocal position. If the F-number of infrared lens assembly 104 is increased too much, however, the diffraction effects will decrease spatial resolution (e.g., clarity) such that a target scene may not be in acceptable focus. An increased F-number may also reduce the thermal sensitivity (e.g., the noise-equivalent temperature difference will worsen).

Infrared sensor 170 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 172 and processed into an infrared image displayed on display 108.

For instance, in examples in which infrared sensor 170 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 172 may measure the change in resistance of each bolometer by applying a current (or voltage) to each bolometer and measure the resulting voltage (or current) across the bolometer. Based on these data, processor 172 can determine the amount of infrared energy emitted by different portions of a target scene and control display 108 to display a thermal image of the target scene.

Independent of the specific type of infrared sensor elements included in the FPA of infrared sensor 170, the FPA array can define any suitable size and shape. In some examples, infrared sensor 170 includes a plurality of infrared sensor elements arranged in a grid pattern such as, e.g., an array of sensor elements arranged in vertical columns and horizontal rows. In various examples, infrared sensor 170 may include an array of vertical columns by horizontal rows of, e.g., 16×16, 50×50, 160×120, 120×160, or 650×480. In other examples, infrared sensor 170 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 170. The ROIC is used to output signals corresponding to each of the pixels. Such ROIC is commonly fabricated as an integrated circuit on a silicon substrate. The plurality of detector elements may be fabricated on top of the ROIC, wherein their combination provides for the IR sensor 170. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 170 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 170. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 170, with such frames being produced at a rate sufficient to generate a video representation (e.g. 30 Hz, or 60 Hz) of the thermal image data.

The front end circuitry 152 includes circuitry for interfacing with and controlling the IR camera module 150. In addition, the front end circuitry 152 initially processes and transmits collected infrared image data to a processor 172 via a connection therebetween. More specifically, the signals generated by the IR sensor 170 are initially conditioned by the front end circuitry 152 of the thermal imaging camera 100. In certain embodiments, as shown, the front end circuitry 152 includes a bias generator 174 and a pre-amp/integrator 176. In addition to providing the detector bias, the bias generator 174 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 170. Such bias compensation can be automatically controlled by the thermal imaging camera 100 or software, or can be user controlled via input to the output/control device 160 or processor 172. Following provision of the detector bias and optional subtraction or addition of the average bias current, the signals can be passed through a pre-amp/integrator 176. Typically, the pre-amp/integrator 176 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 172 of the thermal imaging camera 100.

In some embodiments, the front end circuitry 152 can include one or more additional elements for example, additional sensors 178 or an ADC 180. Additional sensors 178 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 170 to assist in radiometry calculations. A magnetic sensor, such as a Hall effect sensor, can be used in combination with a magnet mounted on the lens to provide lens focus position information. Such information can be useful for calculating distances, or determining a parallax offset for use with visual light scene data gathered from a visual light sensor.

An ADC 180 can provide the same function and operate in substantially the same manner as discussed below, however its inclusion in the front end circuitry 152 may provide certain benefits, for example, digitization of scene and other sensor information prior to transmittal to the processor 172 via the connection therebetween. In some embodiments, the ADC 180 can be integrated into the ROIC, as discussed above, thereby eliminating the need for a separately mounted and installed ADC 180.

In some embodiments, front end components can further include a shutter 190. A shutter xx can be externally or internally located relative to the lens xx and operate to open or close the view provided by the IR lens assembly 104. As is known in the art, the shutter 190 can be mechanically positionable, or can be actuated by an electro-mechanical device such as a DC motor or solenoid. Embodiments of the invention may include a calibration or setup software implemented method or setting which utilize the shutter 190 to establish appropriate bias levels for each detector element.

Components described as processors within thermal imaging camera 100, including processor 172, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 172 may also include memory that stores program instructions and related data that, when executed by processor 172, cause thermal imaging camera 100 and processor 172 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 172 may also be implemented as a System on Chip that integrates all components of a computer or other electronic system into a single chip. These elements manipulate the conditioned scene image data delivered from the front end stages 154 in order to provide output scene data that can be displayed or stored for use by the user. Subsequently, the processor 172 (processing circuitry) sends the processed data to a display 108 or other output/control device 160.

During operation of thermal imaging camera 100, processor 172 can control infrared camera module 150 to generate infrared image data for creating an infrared image. Processor 172 can generate a digital "frame" of infrared image data. By generating a frame of infrared image data, processor 172 captures an infrared image of a target scene at a given point in time.

Processor 172 can capture a single infrared image or "snap shot" of a target scene by measuring the electrical signal of each infrared sensor element included in the FPA of infrared sensor 170 a single time. Alternatively, processor 172 can capture a plurality of infrared images of a target scene by repeatedly measuring the electrical signal of each infrared sensor element included in the FPA of infrared sensor 170. In examples in which processor 172 repeatedly measures the electrical signal of each infrared sensor element included in the FPA of infrared sensor 170, processor 172 may generate a dynamic thermal image (e.g., a video representation) of a target scene. For example, processor 172 may measure the electrical signal of each infrared sensor element included in the FPA at a rate sufficient to generate a video representation of thermal image data such as, e.g., 30 Hz or 60 Hz. Processor 172 may perform other operations in capturing an infrared image such as sequentially actuating a shutter 190 to open and close an aperture of infrared lens assembly 104, or the like.

With each sensor element of infrared sensor 170 functioning as a sensor pixel, processor 172 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. Processor 172 may perform computations to convert raw infrared image data into scene temperatures (radiometry) including, in some examples, colors corresponding to the scene temperatures.

Processor 172 may control display 108 to display at least a portion of an infrared image of a captured target scene. In some examples, processor 172 controls display 108 so that the electrical response of each sensor element of infrared sensor 170 is associated with a single pixel on display 108. In other examples, processor 172 may increase or decrease the resolution of an infrared image so that there are more or fewer pixels displayed on display 108 than there are sensor elements in infrared sensor 170. Processor 172 may control display 108 to display an entire infrared image (e.g., all portions of a target scene captured by thermal imaging camera 100) or less than an entire infrared image (e.g., a lesser port of the entire target scene captured by thermal imaging camera 100). Processor 172 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 156. Visible light camera module 156 may be configured to receive visible light energy from a target scene and to focus the visible light energy on a visible light sensor for generation of visible light energy data, e.g., that can be displayed in the form of a visible light image on display 108 and/or stored in memory. Visible light camera module 156 can include any suitable components for performing the functions attributed to the module herein. In the example of FIG. 3, visible light camera module 156 is illustrated as including visible light lens assembly 106 and visible light sensor 192. As described above with respect to FIGS. 1 and 2, visible light lens assembly 106 includes at least one lens that takes visible light energy emitted by a target scene and focuses the visible light energy on visible light sensor 192. Visible light sensor 192 responds to the focused energy by generating an electrical signal that can be converted and displayed as a visible light image on display 108.

Visible light sensor 192 may include a plurality of visible light sensor elements such as, e.g., CMOS detectors, CCD detectors, PIN diodes, avalanche photo diodes, or the like.

The number of visible light sensor elements may be the same as or different than the number of infrared light sensor elements.

In operation, optical energy received from a target scene may pass through visible light lens assembly 106 and be focused on visible light sensor 192. When the optical energy impinges upon the visible light sensor elements of visible light sensor 192, photons within the photodetectors may be released and converted into a detection current. Processor 172 can process this detection current to form a visible light image of the target scene.

During use of thermal imaging camera 100, processor 172 can control visible light camera module 156 to generate visible light data from a captured target scene for creating a visible light image. The visible light data may include luminosity data indicative of the color(s) associated with different portions of the captured target scene and/or the magnitude of light associated with different portions of the captured target scene. Processor 172 can generate a "frame" of visible light image data by measuring the response of each visible light sensor element of thermal imaging camera 100 a single time. By generating a frame of visible light data, processor 172 captures visible light image of a target scene at a given point in time. Processor 172 may also repeatedly measure the response of each visible light sensor element of thermal imaging camera 100 so as to generate a dynamic thermal image (e.g., a video representation) of a target scene, as described above with respect to infrared camera module 150.

With each sensor element of visible light camera module 156 functioning as a sensor pixel, processor 172 can generate a two-dimensional image or picture representation of the visible light from a target scene by translating an electrical response of each sensor element into a time-multiplexed electrical signal that can be processed, e.g., for visualization on display 108 and/or storage in memory.

Processor 172 may control display 108 to display at least a portion of a visible light image of a captured target scene. In some examples, processor 172 controls display 108 so that the electrical response of each sensor element of visible light camera module 156 is associated with a single pixel on display 108. In other examples, processor 172 may increase or decrease the resolution of a visible light image so that there are more or fewer pixels displayed on display 108 than there are sensor elements in visible light camera module 156. Processor 172 may control display 108 to display an entire visible light image (e.g., all portions of a target scene captured by thermal imaging camera 100) or less than an entire visible light image (e.g., a lesser port of the entire target scene captured by thermal imaging camera 100).

As noted above, processor 172 may be configured to determine a distance between thermal imaging camera 100 and an object in a target scene captured by a visible light image and/or infrared image generated by the camera. Processor 172 may determine the distance based on a focus position of the infrared optics associated with the camera. For example, processor 172 may detect a position (e.g., a physical position) of a focus mechanism associated with the infrared optics of the camera (e.g., a focus position associated with the infrared optics) and determine a distance-to-target value associated with the position. Processor 172 may then reference data stored in memory that associates different positions with different distance-to-target values to determine a specific distance between thermal imaging camera 100 and the object in the target scene.

In these and other examples, processor 172 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 172 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 172 may control display 108 to display the visible light image and the infrared image in a combined arrangement. In a combined arrangement, the visible light image and the infrared image may be superimposed on top of one another. An operator may interact with user interface 158 to control the transparency or opaqueness of one or both of the images displayed on display 108. For example, the operator may interact with user interface 158 to adjust the infrared image between being completely transparent and completely opaque and also adjust the visible light image between being completely transparent and completely opaque. Such an example combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 172 may also combined scene information with other data, such as radiometric data, alarm data, and the like.

Additionally, in some embodiments, the processor 172 can interpret and execute commands from user interface 158, an output/control device 160. This can involve processing of various input signals and transferring those signals to the front end circuitry 152 via a connection therebetween. Components (e.g. motors, or solenoids) proximate the front end circuitry 152 can be actuated to accomplish the desired control function. Exemplary control functions can include adjusting the focus, opening/closing a shutter, triggering sensor readings, adjusting bias values, etc. Moreover, input signals may be used to alter the processing of the image data that occurs in the processor 172.

Processor can further include other components to assist with the processing and control of the infrared imaging camera 100. For example, as discussed above, in some embodiments, an ADC can be incorporated into the processor 172. In such a case, analog signals conditioned by the front-end stages 154 are not digitized until reaching the processor 172. Moreover, some embodiments can include additional on board memory for storage of processing command information and scene data, prior to transmission to the display 108 or the output/control device 160.

An operator may interact with thermal imaging camera 100 via user interface 158, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale or amber. In other examples, display 108 is configured to display an infrared image in a color palette such as, e.g., ironbow, blue-red, or other high contrast color scheme. Combination of grayscale and color palette displays are also contemplated.

While processor 172 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 172 controls infrared camera module 150 and visible light camera module 156 with the aid of instructions associated with program information that is stored in memory to generate a visible light image and an infrared image of a target scene. Processor 172 further controls display 108 to display the visible light image and/or the infrared image generated by thermal imaging camera 100.

In various embodiments, only a portion of the FPA (which is less than all of the FPA) is used for sensing infrared energy for generating a thermal image. This portion is referred to as the active portion, and the sensor pixels within the active portion are used for gathering thermal image data for thermal images. The remainder of the FPA, which is not used for sensing infrared energy or generating a thermal image, is the unused portion or inactive portion of the FPA, though some pixels in the inactive portion, adjacent to the active portion, may be used for parallax correction in some embodiments. As such, in some embodiments only a portion of the array may be used for generating thermal images.

The portion of the FPA which is used as the active portion may be selected based upon the operability of the sensor elements in various areas of the FPA. For example, if the FPA includes an unacceptable defect, which may be formed by an unacceptable or objectionable number of adjacent inoperative or faulty sensor pixels, the active portion of the FPA may be selected so as to exclude this defect and leave it in the inactive portion of the FPA. In this way, the defect does not affect the ability of the thermal imaging camera 100 to obtain acceptable thermal images of the scene. In some embodiments, if the processor of the camera 100 is able to mathematically compensate for the inoperative pixels, the defect formed by such inoperative pixels may be acceptable and this acceptable defect may be included in the active portion or in the inactive portion of the FPA, depending upon its location. For example, the processor of the camera may be able to mathematically compensate for a number of adjacent inoperative pixels at or below a certain threshold or cutoff, and this threshold may be predetermined by the manufacturer. Inoperative pixels which are at or below this threshold may be acceptable, while inoperative pixels above this threshold may be unacceptable. During manufacturing of the thermal imaging camera, if the number of adjacent inoperative pixels in an FPA is above the threshold, the inoperative pixels may be considered to be an unacceptable defect and the camera may be assembled and programmed such that the unacceptable defect is located in the inactive portion of the FPA. Acceptable defects in the FPA may be located in the active portion or in the inactive portion of the FPA, as the location of the active portion of the FPA is determined by the location or locations of the unacceptable defect or defects.

In some embodiments, the FPA is included within an infrared sensor assembly or package in which the FPA is under a vacuum. The FPA, which may be a silicon die or wafer, may be attached to a substrate, such as a ceramic substrate, such as by an adhesive. The FPA may be contained within a cover, which may extend over the FPA and attach to the substrate at the periphery of the cover in order to enclose the FPA in a sealed environment within which it may be under vacuum. The cover may include a transparent window through which infrared energy may be directed from the lens and onto the FPA within the infrared sensor assembly.

In some embodiments, the sensor pixels of the FPA may be tested prior to enclosing the FPA in the assembly, such as by checking the sensor pixels electrically. If a defect is identified, the position of attachment of the FPA to the substrate may be adjusted such that the defect is located in the selected inactive portion of the FPA and the window and central axis of the lens align with the selective active portion of the FPA, having normal or adequate functioning sensor pixels. In some embodiments, the sensor pixels of the FPA may be tested after the FPA is enclosed and under vacuum in the infrared sensor assembly, such as by electrical and/or thermal testing. When thermal testing is done, a defect may be identified which may not have been identified by electrical testing. In such embodiments, the position of the of the entire infrared sensor assembly, or the position of the FPA mount (e.g., printed circuit board, mounting board, or other thermal imaging camera component) to which it is attached, or even the position of the lens assembly, may be adjusted to position the FPA such that the defect is located in the inactive portion of the FPA.

Figure 4:
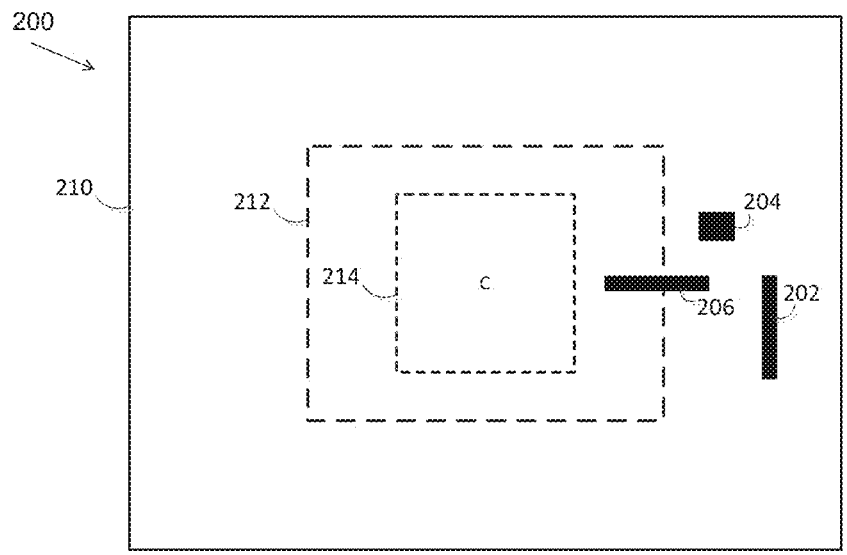
FIG. 4 is an illustration of a FPA including defective portions and alternative active portions.
Figure 5:
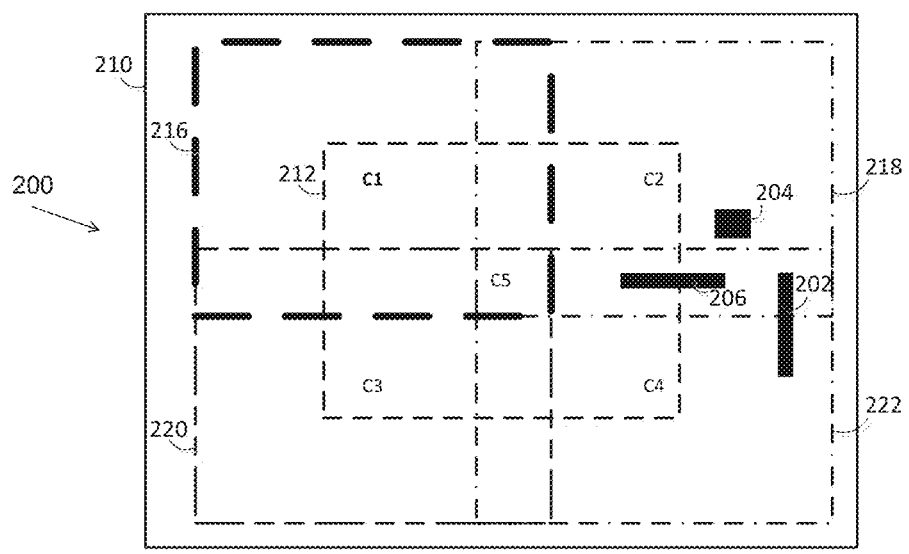
FIG. 5 is an illustration of the FPA of FIG. 4 including different alternative active portions.

An example of an FPA having a defect is shown in FIGS. 4 and 5. The FPA 200 includes three defects 202, 204, 206, each made of a plurality of defective pixels adjacent to each other such that mathematical compensation for the defect would not be satisfactory. In each figure, alternative active portions are shown outlined by dashed lines and the outer edge of the FPA 200. In FIG. 4, there are three options for active portions shown. If the entire FPA 200 was used as the active portion 210, this would include the three defects 202, 204, and 206. If a smaller, centrally located active portion 212 was used as the active portion, this would still include a portion of defect 206. If the smallest centrally located active portion 212 was used as the active portion, then all three defects 202, 204, 206 would be excluded from the active area. In this example, the consecutively smaller centrally located active areas result in the active areas having fewer sensor pixels. For example, the active area 210 including the entire focal plane array may include an array of 320 by 240 pixels, while active area 212 may include 160 by 120 pixels, and active area 214 may include 80 by 80 pixels. Therefore, as smaller active areas are used, the number of sensor pixels included in the active area decreases and the infrared image resolution also decreases.

It should be noted that in the example shown in FIG. 4, the center point C (the midpoint of both the length and width) of each active area is in the same location as the center point of the entire FPA. As such, no repositioning of the FPA is required in order to use the smaller centrally located active areas 212, 214 because in all cases, the center of the lens generally aligns with the center of the active area. However, in cases where the defect is close to the center point, there may be an insufficient number of pixels in the active area, after excluding the defective pixels, for the FPA to be useful. Various embodiments therefore address this problem by allowing for repositioning the FPA relative to the camera lens during camera assembly so that the active area may have a different center point than the FPA as a whole, as shown for example in FIG. 5.

In FIG. 5, various potential active areas are outlined by dashed lines. Two of the potential active areas, 210 and 212, are centrally located, having center points which coincide with the center point of the FPA, which is located at C5. As in FIG. 4, one alternative active area 210 includes the entire FPA, while centrally located alternative active area 212 includes a smaller portion of the FPA, and the center point C of both active areas 210, 212 is the same as the center point of the entire FPA. In addition, FIG. 5 includes four other alternative potential active areas, 216, 218, 220, and 222, which are laterally located and have center points C1, C2, C3, and C4 respectively. The center points C1, C2, C3, and C4 of each of these alternative active areas are displaced from the center point C of the entire FPA.

It can be seen that in FIG. 5, either potential active area 216 or potential active area 220 could be selected as the portion of the FPA used as the active area by a thermal imaging camera, thereby avoiding the defect entirely. In comparison, in FIG. 4 in which each potential active area is centered on the center point of the FPA, only the smallest potential active area 214 may be selected to avoid the defect when the FPA is used in a thermal imaging camera. For example, if the FPA in FIGS. 4 and 5 is 320 by 240, then the active area 214 in FIG. 4 could be 80 by 80 pixels, while the active areas 216 and 220 in FIG. 5 could be 160 by 120 pixels. As such, by including alternative potential active areas 216, 220 that are both centered on the center point and displaced away from the center point of the FPA, the embodiment shown in FIG. 5 allows for a larger portion of the FPA to be used as the active area while still avoiding the defect. In this way, the FPA in FIG. 5 may be used to produce thermal images having a higher resolution then would be possible using any of the alternative active areas of FIG. 4.

In order for the thermal imaging camera to use less than all of the FPA as an active area, the controller of the FPA may be programmed to gather or use thermal imaging data from the active area alone. As such, thermal energy from the scene may be focused upon the entire FPA or a larger portion of the FPA, but data may only be collected and/or used from the active portion of the FPA for generating the thermal image. In some embodiments, a small margin of additional pixels, adjacent to the active area, may also be used for parallax correction, or this portion of pixels may be included in the active area.

Typically, when the entire FPA is used as the active area, the central axis of the lens assembly is generally aligned with the center point of the FPA. In embodiments in which a portion of the FPA which is less than all of the FPA is used as the active area and in which the center point of the active area coincides with the center point of the FPA, the center of the lens image is still generally centered on the center point of the active area. In some embodiments, a portion of the FPA which is less than all of the FPA is used as the active area and the center point of the active area does not coincide with the center point of the FPA. This active area may be used without realigning any of the camera elements in some embodiments. In other embodiments, the relative positions of the FPA and the lens assembly may be adjusted during camera assembly such that the central axis of the lens assembly generally aligns with the center point of the active area. This adjustment may be done in a variety of ways.

In some embodiments, the position of the FPA on the substrate may be adjusted prior to enclosing the FPA in the infrared sensor assembly. The entire infrared sensor assembly may then be attached to the printed circuit board in the usual way and in the usual position and then positioned in the thermal imaging camera. In this way, the realignment of the active portion with the lens assembly occurs by adjusting the position of the FPA within the infrared sensor assembly, and the remainder of the manufacturing process occurs as normal, with no positioning adjustment, in the same manner as for cameras having FPAs without an objectionable defect.

In other embodiments, the FPA may be contained within the infrared sensor assembly in the normal way with no positioning adjustment. In some such embodiments, the position in which the infrared sensor assembly is attached to an FPA mount, such as a printed circuit board, mounting board, or other thermal imaging camera component, may be adjustable. In some such embodiments, the position in which the FPA package is attached to the FPA mount may be selected from a plurality of predetermined position options in order to select an active area. For example, either the infrared sensor assembly, or the FPA mount, or both, may include one or a plurality of positioning elements. For example, one of the infrared sensor assembly or the FPA mount may include a plurality of openings, such as five openings. The other of the infrared sensor assembly and the FPA mount may include a projection, such as a pin, post or peg, for insertion into a selected one of the openings for aligning the infrared sensor assembly and the FPA mount in a desired position, such as one of five optional positions corresponding to one of the five openings. The number of possible alignment positions may correspond to the number of the plurality positioning elements, such as the number of openings. The positioning elements may form a stable, fixed connection or may merely function to provide a relative positioning, with a more stable, fixed connection subsequently provided by one or more connecting elements such as screws. The FPA may be electrically connected to the FPA mount, such as with a printed circuit board, and the FPA mount may be further electrically connected to other components of the thermal imaging camera, such as another printed circuit board, by methods known in the art, such as flex tape, flexible cable or wire. Alternatively, the FPA may be physically connected to the FPA mount but electrically connected to other components of the thermal imaging camera such as another printed circuit board, by methods known in the art, such as flex tape, flexible cable or wire.

Alternatively, a pair of orthogonally oriented screws may be used for incremental positioning adjustments. For example, the FPA may include a pair of flanges or other elements projecting perpendicularly to the planar surface of the FPA. The pair of flanges may be perpendicular to each other and may each include an opening for receipt of a screw therethrough. The FPA mount to which the FPA is mounted may likewise include a pair of flanges or other elements projecting perpendicularly to the planar surface of the printed circuit board. These flanges are also perpendicular to each other and include an opening for receipt of a screw. The flanges of the FPA and of the FPA mount are located to be in rough alignment, such that a first screw may extend through a first flange of the FPA and through a first flange of the FPA mount, and a second screw may extend through a second flange of the FPA and the second flange of the FPA mount. In addition, the openings of one or both of the flanges of the FPA or the FPA mount may be elongated (such as having an oval or rectangular cut-out shape), such that the screw may be inserted through the opening anywhere along the length of the opening. By using elongated openings, the first and second screws may be turned to adjust the relative positions of the FPA and the FPA mount. Alternatively, such a pair of flanges may be used on each of the FPA mount and the support to adjust their relative positions.

In other embodiments, the infrared sensor assembly may be attached to the FPA mount, such as the printed circuit board, in a standard position, with no positioning alternatives, and the FPA mount may then be attached to a support which may be located within the thermal imaging camera, or which may later be positioned within the thermal imaging camera. The support may be another printed circuit board, the camera housing, or another component of the camera such as an electromagnetic or thermal interference shield which may be located between printed circuit boards of the thermal imaging camera. Such a shield is described, for example, in U.S. Pat. No. 8,235,590, which is incorporated herein by reference. The position of the FPA mount (to which the infrared sensor assembly is attached) on the support may be adjustable, such as to a selected one of a plurality of predetermined positions, which enables the use of one of various predetermined optional portions of the FPA as the active portion. The adjustability of the attachment of the FPA mount to the support may be provided by alignment elements and attachment elements such as those described above with regard to the alignment and attachments of the infrared sensor assembly to the FPA mount, for example.

In still other embodiments, the position of the lens assembly may be adjustable. For example, the lens assembly may be mounted on the housing of the camera in a selected one of a plurality of predetermined positions, such that the center of axis of the lens is centered upon the center point of the selected portion of the FPA which will function as the active portion. In such embodiments, the remainder of the thermal imaging camera may be assembled using standard positions, with no positioning adjustment.

In embodiments described above, the position of one of the elements of the thermal imaging portion of the camera may be selectively chosen from a plurality of positioning options in order to allow for a selected portion of the FPA to be used as the active portion. For ease of manufacturing, the element or elements having a variable and selectable position may include one or more positioning elements which allow a position of the element to be selected from a plurality of predetermined optional positions, in which one or more of the predetermined positions may result in the center point of the active portion being offset from the center point of the FPA and one or more may result in the center point of the active portion coinciding with the center point of the FPA. The positioning element, which may provide alignment and/or attachment of the selectively repositionable element of the camera, can be used during manufacturing to enable the element to be quickly aligned and secured into the selected position. In this way, any FPA may be incorporated into the thermal imaging camera, and the position of the element having a variable position may be selected during assembly based upon whether or not the FPA includes an objectionable defect and upon the location of the objectionable defect.

Figure 6:
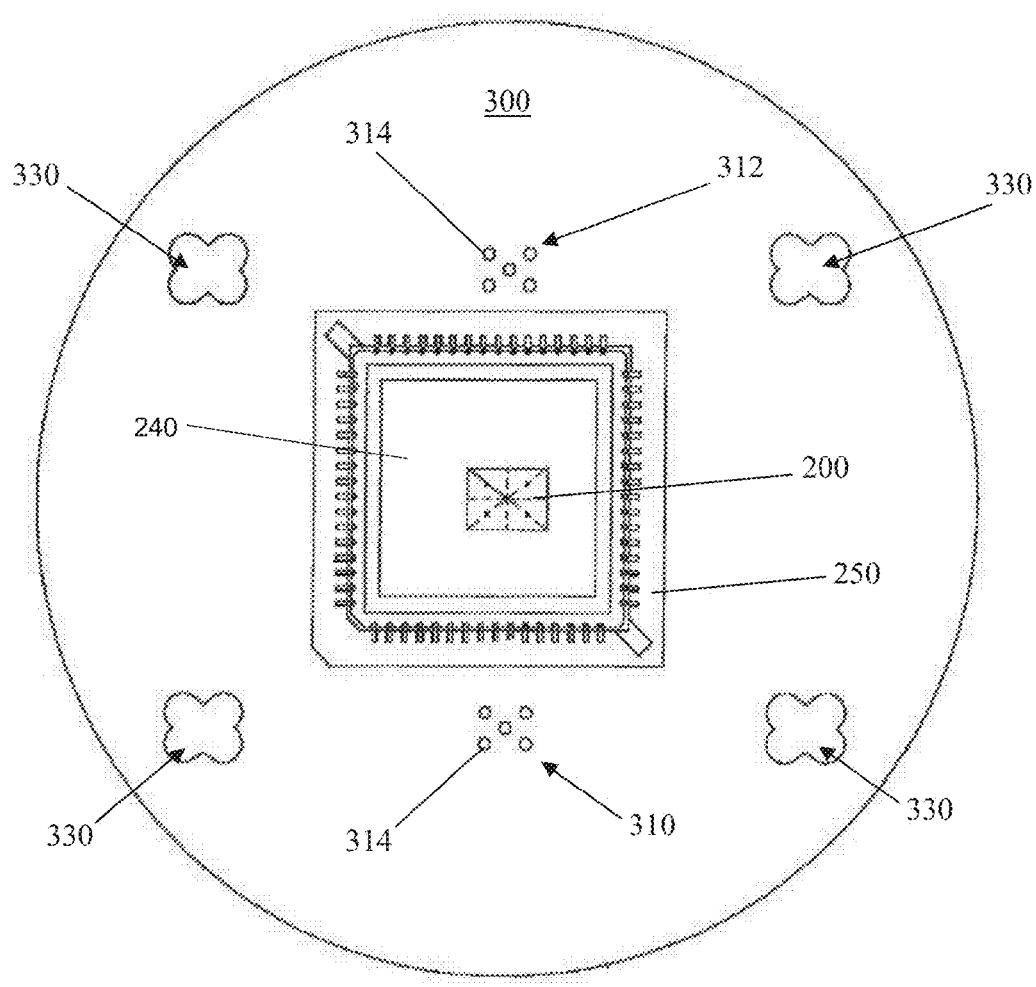
FIG. 6 is a top view of an infrared sensor assembly and printed circuit board.

One example of an infrared sensor assembly including alignment elements is shown in FIG. 6. The FPA 200 is attached to the substrate within the infrared sensor assembly 240, and the infrared sensor assembly 240 is mounted onto the FPA mount, which, in this embodiment, is printed circuit board 300 by positioning the FPA and securing it within a socket 250 or recess in the printed circuit board 300 though other forms of alignment and attachment may alternatively be used. Alternatively, a mounting board or other component of the thermal imaging camera, which is not a printed circuit board, may be used. The printed circuit board 300 includes a plurality of positioning elements 314, which in this embodiment are openings. The positioning elements 314 are grouped together in a first cluster 310 between one edge of the infrared sensor assembly 240 and the edge of the printed circuit board 300 and in a second cluster 312 between an opposing edge of the infrared sensor assembly 240 and an opposing edge of the printed circuit board 300. In this way the first and second clusters 310, 312 are spaced apart from each other and on opposite sides of the infrared sensor assembly 240, though other locations are also possible. Each of the first cluster and second cluster 310, 312 include the same number of positioning elements 314, which in this embodiment is five, but could be more or less. Alternatively, a single set or cluster of positioning elements may be used, or more than two sets or clusters of positioning elements may be used.

The positioning elements 314 may be shaped to be complementary to one or more positioning elements located on the support (not shown). For example, in the embodiment shown, the positioning elements 314 of the printed circuit board 300 are openings extending through the printed circuit board 300. The positioning elements of the support may be one or more protrusions, such as a peg, pin, or similar structure, which may be inserted into a selected one of the openings in each cluster or set of openings in the printed circuit board 300 to stabilize the position of the printed circuit board 300 relative to the support. For example, the support might include one protrusion positioned to be aligned with a selected one opening in the first cluster 310 and a second protrusion positioned to be aligned with and inserted into a selected one opening in the second cluster 312. Alternatively, the printed circuit board 300 could include one or more protrusions for insertion into selected openings in the support. Alternatively, other positioning elements could be used which would allow the printed circuit board to be aligned in one of a plurality of positions relative to the support in preparation for fixed attachment, or as a means of attachment, during assembly of the camera. The openings as shown in this embodiment are round, and the protrusions have a round cross section to fit snugly within the openings, but other shapes of the opening and protrusion cross section may be used, such as square. When alternative shapes are used, the protrusion may engage with the opening in a manner that does not permit rotation of the protrusion within the opening (as could occur with a round opening) and the relative positions may be maintained using only a single cluster of openings and a single protrusion.

Figure 7:
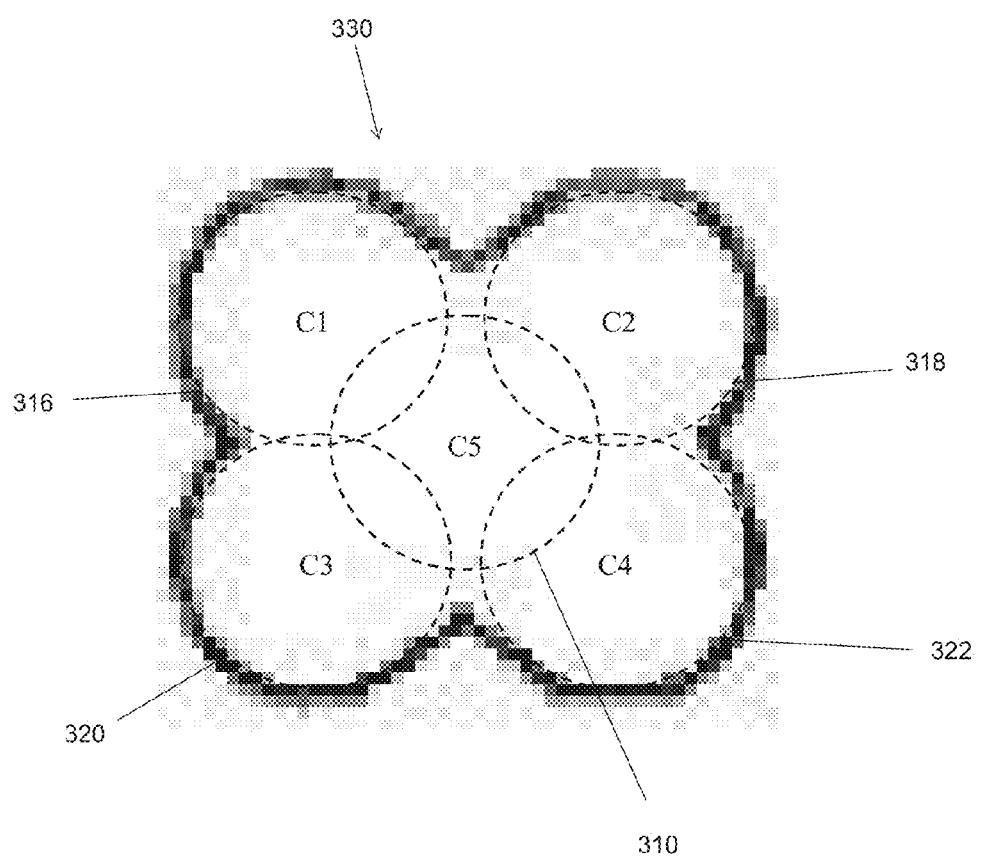
FIG. 7 is a top view of an attachment element.

In embodiments in which the positioning elements serve only to position the FPA mount (e.g., printed circuit board 300) in a selected position but not to firmly attach it, the FPA mount may include attachment elements which are able to accommodate the variety of locations in which the FPA mount may be positioned. An example of this is the attachment elements 330 shown in FIG. 6 and further shown in FIG. 7. The attachment elements 330 in this embodiment are openings for screws which may be placed through them and into the support. The openings are not round in shape but rather include four connected semicircles, as would be formed by four overlapping circles giving it the shape of the leaf portion of a four leaf clover. The support to which the printed circuit board 300 is attached also includes an opening, which may be a standard circular threaded opening (not shown), for receipt of a screw which also passes through the selected portion of the opening in the printed circuit board 300 and then into the opening in the support. Each of the semicircles are sized to hold a screw within the semicircle and into the support to position the printed circuit board 300 relative to the support such that, in the end, the lens assembly is positioned such that a particular selected section of the FPA forms the active area. For example, the use of portion 316 corresponds to active area 216, portion 318 corresponds to active area 218, portion 320 corresponds to active area 220, and portion 322 corresponds to active area 222. Use of a screw in the central portion 310, labeled C5, does not result in shifting of the FPA relative to the lens assembly as compared to normal assembly (with no objectionable defect) and may be used for any active area having a center point which coincides with the center point of the FPA, such as active areas 210, 212 or 214. In order to be useful in the central portion 310, a screw may be used having a head of sufficient size to extend beyond the edge of the opening of the attachment element 330 and to overlay the printed circuit board 300, for example. Alternatively, the attachment element may have a different shape which allows various screw positions, such as slots or a pair of crossed slots forming an X-shape. In some embodiments, the attachment element may be used for both positioning and attachment, without the use of positioning elements.

In alternative embodiments, the manufacturer may have a supply of FPA mounts with attachment elements in various predetermined locations. Each predetermined location may correspond to a particular relative position of the FPA mount and the support. In such embodiments, the attachment element may be an opening, such as a round opening, that does not accommodate multiple positions of screws. The FPA mount having an opening at the desired location (resulting in the desired relative positioning of the FPA mount and support) may be selected during manufacturing based on which portion of the FPA is intended to be the active portion.

Figure 8:
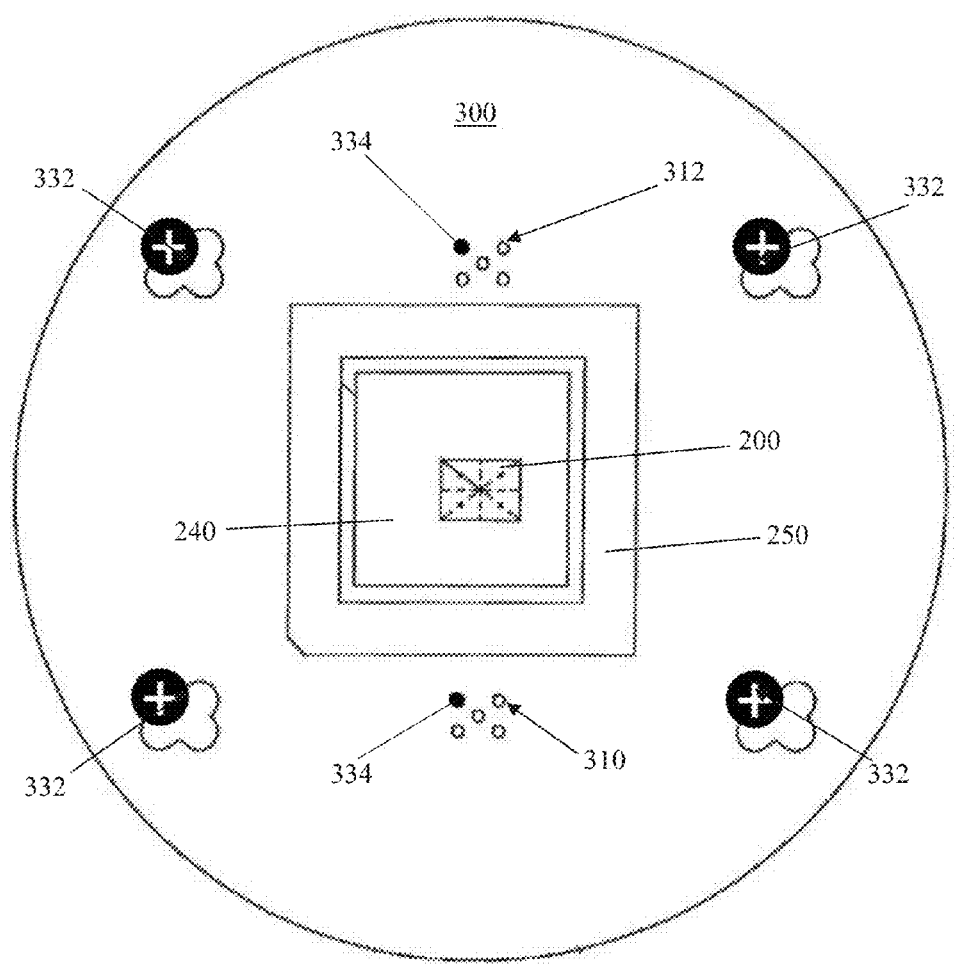
FIG. 8 is a top view of an infrared sensor assembly and printed circuit board with attachment elements.

In FIG. 8, the FPA 200 and the FPA mount of FIG. 6 (printed circuit board 300) are shown with the printed circuit board 300 aligned with and attached to the support (not shown). Protrusions 334 which project from the surface of the support have been inserted into openings in the printed circuit board, with one protrusion 334 inserted into an opening in the first cluster 310 and one protrusion 334 inserted into the second cluster 312. In addition, four screws 332 have been inserted into the four attachment elements 330 of the printed circuit board 300, extending through and into openings in the support (not shown) behind the printed circuit board 300. It can be seen that the upper left opening of each cluster 310, 312 is used and the upper left portion of each attachment element 330 is also used, such that corresponding elements are used and the position of the FPA 200 and printed circuit board 300 is shifted down and to the right relative to the support, such that an upper left portion of the FPA, such as portion 216 of FIG. 5, may be used as the active portion.

In some embodiments, the lens assembly may be positioned on, and attached to, the housing of the thermal imaging camera in a selected one of plurality of predetermined positions. For example, the lens portion is the portion of the lens assembly which holds the lens and may be affixed to a base to form the lens assembly, with the base fixedly attached to the camera, such as the camera housing, during assembly. The lens portion may not be centered on the base in all directions but rather may be located eccentrically. For example, the lens position may be affixed to the base closer to one edge of the base than to the other edges. For example, the base may be planar and may be round or square in shape. In embodiments in which it is square, the lens portions may be affixed equidistant between one pair of opposing pair of edges, but may be biased toward one of the edges (closer to one of the edges than the other) of the other opposing pair of edges. Alternatively, the lens portion may be biased in both directions, being closer to one of the corners. The base and housing may each include attachment elements such as one or more openings through which a screw may be inserted. The lens assembly position relative to the housing may be selected by positioning the lens assembly with the lens biased up, down, or laterally toward one side or the other, or diagonally, such that the central axis of the lens is positioned away from the center of the FPA, allowing for alternative active portions to be used. Alternatively, if the entire FPA is to be used, or if the center point of the active portion coincides with the center point of the FPA, a lens assembly may be used in which the lens is centered on the base, such that the central axis of the lens is aligned with the center of the FPA. Therefore, selection of the active portion of the FPA may be achieved by selecting between a lens assembly having a centered or eccentric lens portion, positioning and affixing the lens assembly to the housing in a selected position, and directing the camera to use a selected portion of the FPA as the active portion with the central axis of the lens assembly being aligned with the center point of the active portion.

Still other alternatives are possible for using an off center portion of the FPA as the active portion. For example, in some embodiments the projected infrared energy may be adjusted after passing through the lens, such as through the use of mirrors and/or prisms or other mechanical means to reflect and/or realign the energy. The energy may be centered upon any selected portion of the FPA which may be used as the active portion.

Figure 9:
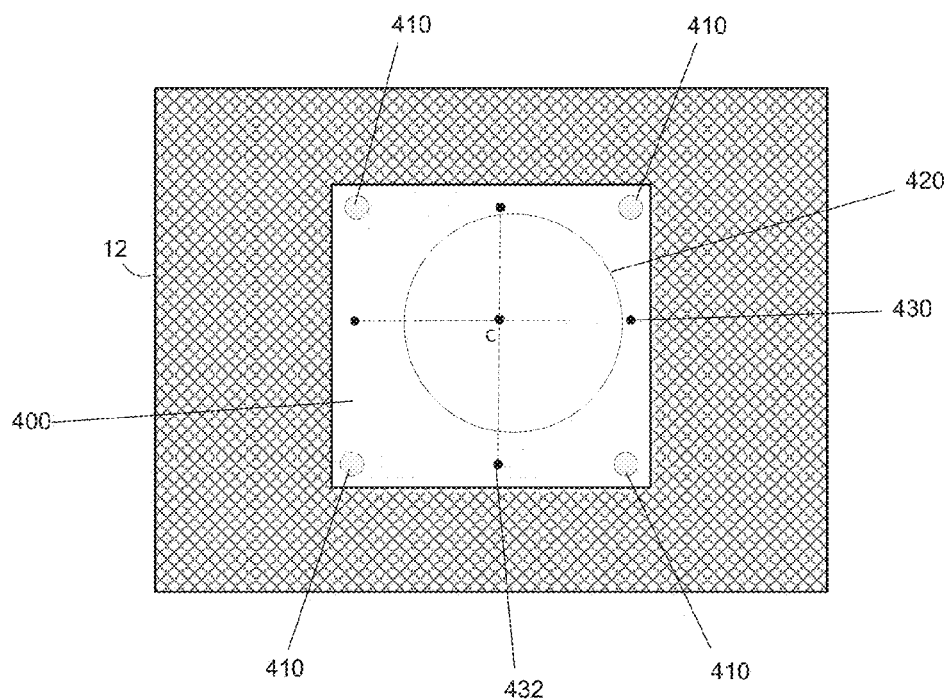
FIG. 9 is an illustration of a lens assembly having an eccentric lens portion.

An example of a portion of a lens assembly having an eccentric lens portion is the illustration shown in FIG. 9. The base 400 includes four attachment elements 410, which in this case are four openings, which align with a plurality of openings (not shown) in the camera housing 102. The attachment elements 410 are positioned symmetrically about the base such that the base could be consecutively rotated 90 degrees and each attachment element 410 would still align with the underlying attachment elements in the housing 102. A projection of the lens portion 420 is shown, representing a projection of the outer edge of the lens when viewed directly from above. The base 400 includes an x-axis 430, a y-axis 432, and a centerpoint C which is midway between each opposing edge of the base and which directly overlies the center point of the FPA. The lens portion is off center in both the y-axis 432 and on the x-axis, such that the projection of the lens portion 420 is biased diagonally, upward and to the right, when the lens assembly is positioned as shown, with C not coinciding with the center of the circular projection of the lens portion 420. Alternatively, it can be appreciated that the lens assembly could be positioned at 90°, 180°, or 270° of rotation relative to the position in FIG. 8, such that the projection of the lens portion 420 would be skewed downward to the right, downward to the left, or upward to the left, respectively. In each of these alternative positions, the central axis of the lens (corresponding to the center of the circular projection of the lens assembly 420) would align with different portions of the FPA, allowing selection of such portions as active portions during camera assembly. Other embodiments are also possible, such as embodiments in which the base is round and the lens assembly is off centered, and/or embodiments in which fewer or more than four mounting elements, such as holes, may be equally spaced or unequally spaced about the base.

Example thermal image cameras and related techniques have been described. The techniques described in this disclosure may also be embodied or encoded in a computer-readable medium, such as a non-transitory computer-readable storage medium containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), a hard disk, optical media, or other computer readable media.

Various examples have been described. These and other examples are within the scope of the following claims.

The invention claimed is:

1. An infrared camera comprising:
a focal plane array (FPA) having a center point;
an FPA mount to which the FPA is mounted;

a lens assembly configured to focus infrared energy onto the FPA, wherein alignment between the lens assembly and the FPA configures the FPA to include an active portion and an inactive portion;

a support, the FPA mount being attached to the support;

wherein the FPA includes a defect identified prior to or during manufacturing of the camera;

wherein the active portion is used by the camera to generate an infrared image and the inactive portion is not used by the camera to generate the infrared image, wherein the defect is located in the inactive portion; and wherein the FPA is aligned relative to the lens assembly such that a center point of the active portion is displaced from the center point of the FPA a distance to exclude the defect from the active portion.

2. The infrared camera of claim 1, wherein the FPA mount further comprises one or more positioning elements and wherein the support further comprises one or more positioning elements complementary to one or more of the positioning elements of the FPA mount, wherein the positioning elements of the FPA mount and the support allows the FPA mount to be aligned with the support in one of a plurality of positions.

3. The infrared camera of claim 2, wherein the one or more positioning elements of the FPA mount comprise a plurality of openings, wherein the one or more positioning elements of the support comprises a protrusion, and wherein the protrusion is inserted into a selected opening in the FPA mount to determine which portion of the focal plane array forms the active portion.

4. The infrared camera of claim 3, wherein the plurality of openings comprises a cluster of five openings including a central opening and a plurality of peripheral openings.

5. The infrared camera of claim 2, wherein the one or more positioning elements of the FPA mount comprise a first plurality of openings in a first cluster and a second plurality of openings in a second cluster, wherein the one or more positioning elements of the support comprises a first protrusion and a second protrusion, and wherein the first protrusion is inserted into a selected opening in the first plurality of openings and the second protrusion is inserted into a selected opening in the second plurality of openings during assembly of the camera to determine which portion of the FPA forms the active portion.

6. The infrared camera of claim 1, wherein the lens assembly comprises one or more lenses attached to a base, wherein the base attaches the lens assembly to the infrared camera, wherein the base is attachable to the infrared camera in a plurality of positions relative to the position of the FPA, and wherein the position in which the base is attached to the infrared camera determines which portion of the FPA forms the active portion.

7. The infrared camera of claim 6, wherein the plurality of positions comprises four positions, and the lens assembly and base may be rotated 90 degrees to move the lens assembly from one position to another prior to attaching the lens assembly to the infrared camera.

8. The infrared camera of claim 1, further comprising an FPA substrate, wherein the FPA may be attached to the substrate in a plurality of positions, and wherein one of the plurality of positions is selected for attachment of the FPA to the substrate during assembly of the camera, and wherein the selected position determines which portion of the FPA forms the active portion.

9. The infrared camera of claim 1, wherein the FPA mount includes a printed circuit board.

10. An infrared camera comprising:

a focal plane array (FPA) having a center point;

an FPA mount to which the FPA is mounted, the FPA mount assembly comprising one or more positioning elements;

a lens assembly configured to focus infrared energy onto the FPA;

a support comprising one or more positioning elements complementary to one or more of the positioning elements of the FPA mount wherein the positioning elements of the FPA mount and the support allows the FPA mount to be aligned with the support in one of a plurality of positions, the FPA mount being attached to the support in the one of the plurality of positions;

wherein the FPA includes a defect identified prior to or during manufacturing of the camera, an active portion, and an inactive portion, the active portion and the inactive portion of the FPA determined by relative alignment between the FPA and the lens assembly; and wherein the position in which the FPA mount is attached configures the FPA to be aligned with the lens assembly such that a center point of the active portion is displaced from the center point of the FPA a distance to locate the defect in the inactive portion.

11. The infrared camera of claim 10, wherein the one or more positioning elements of the FPA mount comprise a plurality of openings, wherein the one or more positioning elements of the support comprises a protrusion, and wherein the protrusion is inserted into a selected opening in the FPA mount to determine which portion of the FPA forms the active portion by configuring a particular alignment between the FPA and the lens assembly.

12. The infrared camera of claim 11, wherein the plurality of openings comprises a cluster of five openings including a central opening and a plurality of peripheral openings.

13. The infrared camera of claim 11, wherein the one or more positioning elements of the FPA mount comprise a first plurality of openings in a first cluster and a second plurality of openings in a second cluster, wherein the one or more positioning elements of the support comprises a first protrusion and a second protrusion, and wherein the first protrusion is inserted into a selected opening in the first plurality of openings and the second protrusion is inserted into a selected opening in the second plurality of openings during assembly of the camera to determine which portion of the FPA forms the active portion by configuring the particular alignment between the FPA and the lens assembly.

14. The infrared camera of claim 10, wherein the FPA mount includes a printed circuit board.

15. A method of producing an infrared camera comprising:

identifying a defect prior to or during manufacturing of the camera in a focal plane array (FPA), the FPA having a center point;

attaching the FPA to an FPA mount in a position;

attaching the FPA mount to a support in a position;

attaching a lens assembly to the camera in a position, the lens assembly focusing infrared energy onto the FPA;

wherein after assembly of the camera the FPA includes an active portion used by the camera to generate an infrared image and an inactive portion which is not used by the camera to generate the infrared image, the active portion having a center point; and wherein the position of one of the FPA, the FPA mount, or the lens assembly is selected from a plurality of available positions to align the FPA relative to the lens assembly such that the active portion does not include the defect, and wherein the plurality of available positions include a position in which the center point of the active portion is displaced from the center point of the FPA and a position in which the center point of the active portion generally coincides with the center point of the FPA.

16. The infrared camera of claim 15, wherein the FPA mount comprises one or more positioning elements and wherein the support further comprises one or more positioning elements complementary to one or more of the positioning elements of the FPA mount, wherein the positioning elements of the FPA mount and the support allow the FPA mount to be aligned with the support in any one of the plurality of positions.

17. The infrared camera of claim 16, wherein the one or more positioning elements of the FPA mount comprise a plurality of openings, further comprising selecting an opening, and wherein mounting the FPA mount to the support comprises inserting the protrusion into the selected opening.

18. The infrared camera of claim 17, wherein the plurality of openings comprises a cluster of five openings including a central opening and a plurality of peripheral openings.

19. The infrared camera of claim 16, wherein the one or more positioning elements of the FPA mount comprise a first plurality of openings in a first cluster and a second plurality of openings in a second cluster, wherein the one or more positioning elements of the support comprises a first protrusion and a second protrusion, further comprising selecting an opening in the first cluster and an opening in the second cluster, wherein attaching the FPA mount to the support comprises inserting the first protrusion into the selected opening in the first plurality of openings and inserting the second protrusion into the selected opening in the second plurality of openings.

20. The infrared camera of claim 15, wherein the lens assembly comprises one or more lenses attached to a base, wherein the base attaches the lens assembly to the camera, and wherein the base is adapted to attach to the camera in a plurality of positions, further comprising selecting a base position from the plurality of positions for attachment to the camera, and wherein the selected position of the base determines which portion of the FPA forms the active portion.

21. The infrared camera of claim 20, wherein the plurality of positions comprises four positions, and wherein each position is oriented, relative to the adjacent position, at 90 degrees of rotation of the base relative to the camera.

22. The infrared camera of claim 15, further comprising an FPA substrate, wherein the FPA may be attached to the substrate in a plurality of positions, further comprising selecting one of the plurality of positions for attachment of the FPA to the substrate, and wherein the selected position aligns the FPA and lens assembly to determine which portion of the FPA forms the active portion.

* * * * *